United States Patent
Scherzer et al.

(10) Patent No.: US 6,760,603 B1
(45) Date of Patent: *Jul. 6, 2004

(54) COMPACT DUAL-POLARIZED ADAPTIVE ANTENNA ARRAY COMMUNICATION METHOD AND APPARATUS

(75) Inventors: Shimon B. Scherzer, Sunnyvale, CA (US); Piu Bill Wong, Monte Sereno, CA (US)

(73) Assignee: Kathrein-Werke KG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/361,787

(22) Filed: Feb. 10, 2003

Related U.S. Application Data

(63) Continuation of application No. 09/502,287, filed on Feb. 11, 2000, now Pat. No. 6,519,478, which is a continuation-in-part of application No. 09/229,482, filed on Jan. 13, 1999, now Pat. No. 6,347,234, which is a continuation-in-part of application No. 08/929,638, filed on Sep. 15, 1997, now Pat. No. 6,108,565.

(51) Int. Cl.[7] .................................................. H04B 1/38
(52) U.S. Cl. ..................... 455/562.1; 455/272; 455/273; 343/725; 343/893
(58) Field of Search ............................. 455/561, 562.1, 455/63.4, 67.11, 101, 269, 272, 273, 274, 277.2, 422.1, 550.1; 343/725, 789, 853, 893

(56) References Cited

U.S. PATENT DOCUMENTS

| | | | |
|---|---|---|---|
| 4,127,819 A | 11/1978 | Keane | |
| 5,164,738 A | * 11/1992 | Walter et al. | ................ 343/789 |
| 5,615,409 A | 3/1997 | Forssen et al. | |
| 5,634,199 A | 5/1997 | Gerlach et al. | |
| 5,680,142 A | 10/1997 | Smith et al. | |
| 5,724,666 A | * 3/1998 | Dent | ........................ 455/562.1 |
| 5,818,385 A | 10/1998 | Bartholomew | |
| 5,832,389 A | * 11/1998 | Dent | ........................ 455/562.1 |
| 5,952,983 A | 9/1999 | Dearnley et al. | |
| 5,966,102 A | 10/1999 | Runyon | |
| 6,005,516 A | * 12/1999 | Reudink et al. | .......... 455/277.2 |
| 6,034,649 A | 3/2000 | Wilson et al. | |
| 6,094,165 A | * 7/2000 | Smith | ........................ 455/562.1 |
| 6,108,565 A | 8/2000 | Scherzer | |
| 6,240,290 B1 | 5/2001 | Willingham et al. | |
| 6,347,234 B1 | 2/2002 | Scherzer | |
| 6,351,237 B1 | 2/2002 | Martek et al. | |
| 6,519,478 B1 | 2/2003 | Scherzer et al. | |

OTHER PUBLICATIONS

International Search Report Mailed Jun. 6, 2001, International Application No. PCT/US01/04142.

* cited by examiner

*Primary Examiner*—Quochien B. Vuong
(74) *Attorney, Agent, or Firm*—Fulbright & Jaworski LLP

(57) ABSTRACT

A wireless communication system base station uses a dual-polarized antenna array to receive two signal groups having orthogonal polarizations. In a preferred embodiment a first signal group is received using a first sub-array of odd-numbered antenna elements, while a second signal group is received using a second sub-array of even-numbered antenna elements. Dipoles within the odd-numbered elements are selected so that they have a common polarization orthogonal to the dipoles selected in the even-numbered elements. The two signal groups thus have orthogonal polarizations. Base station signal processing hardware performs separate spatial channel estimation for these two groups, and uses the polarization diversity to improve performance in both the uplink and downlink. The use of polarization diversity allows the physical dimensions of the antenna array to be kept to a minimum.

12 Claims, 5 Drawing Sheets

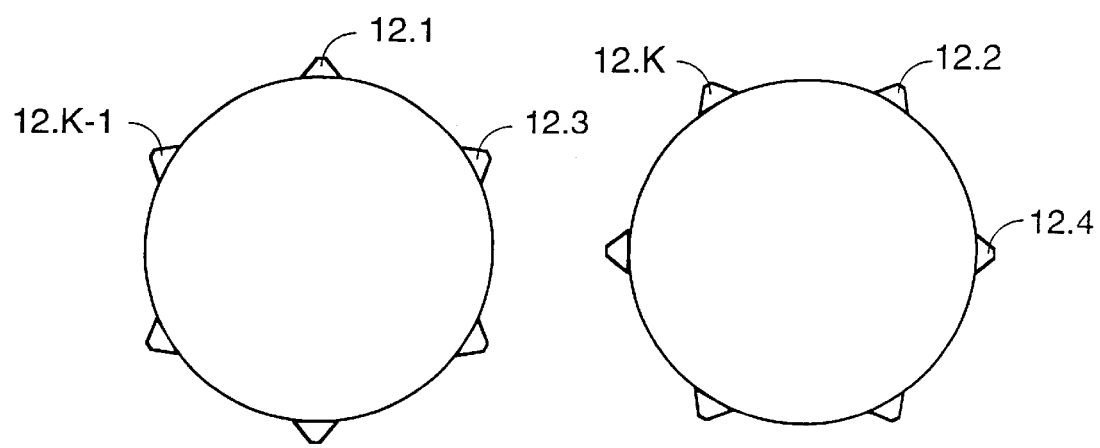
FIG. 3A FIG. 3B
FIG. 4
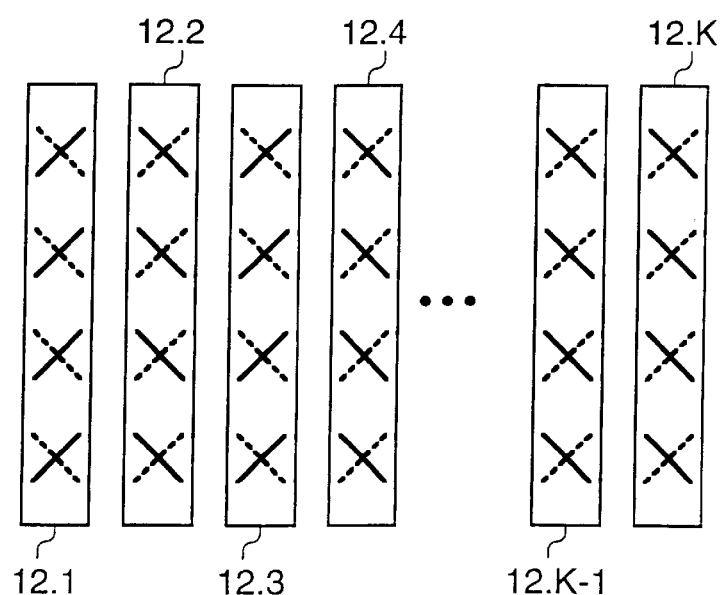

COMPACT DUAL-POLARIZED ADAPTIVE ANTENNA ARRAY COMMUNICATION METHOD AND APPARATUS

CROSS-REFERENCE TO RELATED APPLICATIONS

This application is a continuation of U.S. patent application Ser. No. 09/502,287 filed Feb. 11, 2000 now U.S. Pat. No. 6,519,478, which is a continuation-in-part of U.S. patent application Ser. No. 09/229,482 filed Jan. 13, 1999 now U.S. Pat. No. 6,347,234, which is a continuation-in-part of U.S. patent application Ser. No. 08/929,638 filed Sep. 15, 1997 now U.S. Pat. No. 6,108,565.

TECHNICAL FIELD

This invention relates generally to the field of wireless communications systems. More specifically, it relates to cellular communications system base stations that use adaptive antenna arrays to increase system performance.

BACKGROUND OF THE INVENTION

Wireless communication system base stations conventionally have multiple antennas for communicating with mobile transceivers. Normally, however, only one antenna is selected at one time for communicating with a given mobile. More recently, researchers have been investigating the use of adaptive (smart) antenna arrays at base stations. Using sophisticated signal processing, multiple antennas of the array can be used simultaneously for communicating with a given mobile. Such smart antenna arrays, however, generally require more antenna elements than normally exist on conventional antenna towers. Moreover, in order to provide sufficient channel estimation, beam forming, and spatial diversity, conventional adaptive antenna array techniques require that the physical dimensions of the antenna array be significantly larger than the antenna platforms of existing antenna towers. Unfortunately, increasing the size of the antenna array increases the cost in setting up and maintaining the antenna array.

BRIEF SUMMARY OF THE INVENTION

The present invention is directed to a system and method which one aspect of the present invention, a wireless communications base station is provided having a compact dual-polarized antenna array. The dual polarized antenna array is characterized by a small antenna cross-section, thereby making it very suitable for base stations located in urban areas where zoning is a major issue. Although the dual polarized antenna array is compact, it nonetheless provides sufficient diversity, especially in an urban environment where signal polarization is received in a highly random manner. Compared with spatial diversity, polarization diversity allows the use of a much smaller antenna array. The present invention provides techniques for implementing both polarization diversity and direction finding in a single antenna array.

According to the present invention, each antenna element of the array is dual-polarized. i.e., each antenna element has two orthogonal polarizations that can be independently selected. These dual-polarized antenna elements are adaptively controlled during transmission and reception to provide increased performance using a compact antenna array.

For signal reception, the antenna elements of the antenna array are divided into two groups, a first group and a second group. All antenna elements in the first group have a first polarization, and all antenna elements in the second group have a second polarization orthogonal to the first polarization. In other words, each antenna in the first group has a polarization orthogonal to each antenna in the second group. Since the first and second groups of antenna elements have orthogonal polarizations, reception polarization diversity can be advantageously used for direction finding and fading mitigation (fading diversity) in a single small antenna array. For direction finding, each group of antenna elements can be used independently, resulting in a first direction from the first group and a second direction from the second group. The first and second directions can then be combined to estimate 5 the direction of arrival of received signals. For fading mitigation, signals can be received separately at the first and second antenna groups, then adaptively combined to mitigate the effects of fading.

For signal transmission, all the antenna elements in the antenna array are grouped together and set to have the same polarization. Because signals are then transmitted with the same polarization, the antenna gain for signal transmission is maximized. The common polarization can be set to either one of the two orthogonal polarizations. Alternatively, both polarizations can be simultaneously selected in each antenna element to produce a circular polarization for the signals transmitted from the antenna elements.

In addition to the above techniques, the polarizations of the antenna elements in the array can be selected adaptively in transmission or reception according to the specific signal polarization characteristics of each mobile. For example, in reception, the combination of antenna polarizations can be selected that maximizes the signal-to-interference ratio (SIR) for a given mobile. These polarization settings can then be used for transmission as well to improve reception at the mobile.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 3A and 3B illustrate the division of the antenna array into two groups, a first group (shown in FIG. 3A) containing those elements with odd antenna element indices and a second group (shown in FIG. 3B) containing those elements with even antenna element indices, according to a preferred embodiment of the invention;

FIG. 4 is a schematic diagram of the elements of the antenna array, illustrating that an odd group of elements is selected to have a first polarization, while an even group is selected to have a second polarization orthogonal to the first polarization.

DETAILED DESCRIPTION OF THE INVENTION

Preferred embodiments of the invention will now be described with reference to the figures. Although the following description and figures contain various specifics, these details are provided for the purpose of illustrating the general principles and techniques of the invention. Accordingly, the invention includes within its scope many variations and alterations of the following preferred embodiments.

Figure 1:
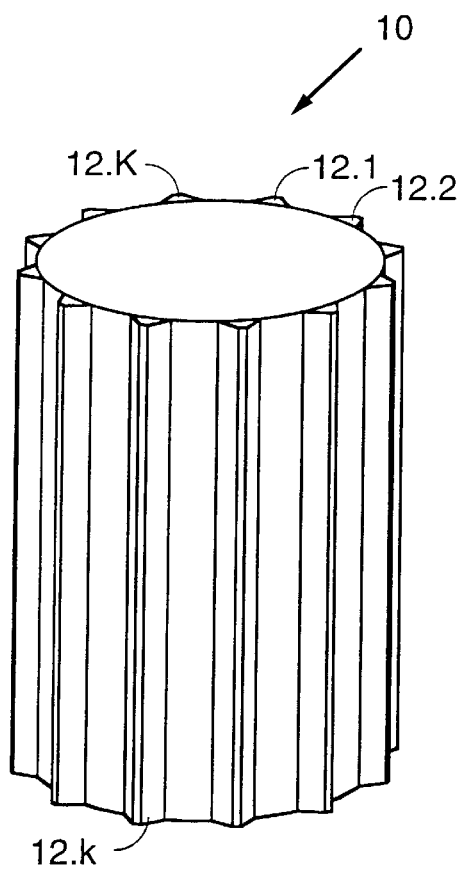
FIG. 1 is a perspective illustration of a dual-polarized antenna array according to a preferred embodiment of the present invention.

FIG. 1 is a perspective illustration of a dual-polarized antenna array according to a preferred embodiment of the present invention. The array 10 comprises a collection of K antenna elements 12.1, 12.2, . . . , 12.k . . . , 12.K arranged in a circle. The array shown in this particular example has twelve elements, i.e., K=12. Each antenna element in the circular array 10 is a dual-polarized antenna element having two independently selectable polarizations. The diameter of the circular array 10 depends on the number K of array elements and the spacing between the elements. Preferably, the spacing between adjacent antenna elements is about 0.5 to 1 wavelengths, and the number of array elements K is an even number in the range of 6 to 20. For example, a typical 12-element antenna array 10 designed for operation in the PCS frequency spectrum around 2 GHz preferably has a diameter of about 0.4 to 0.6 meters, and a preferred spacing between adjacent antennas of about 10 to 16 cm.

Figure 2:
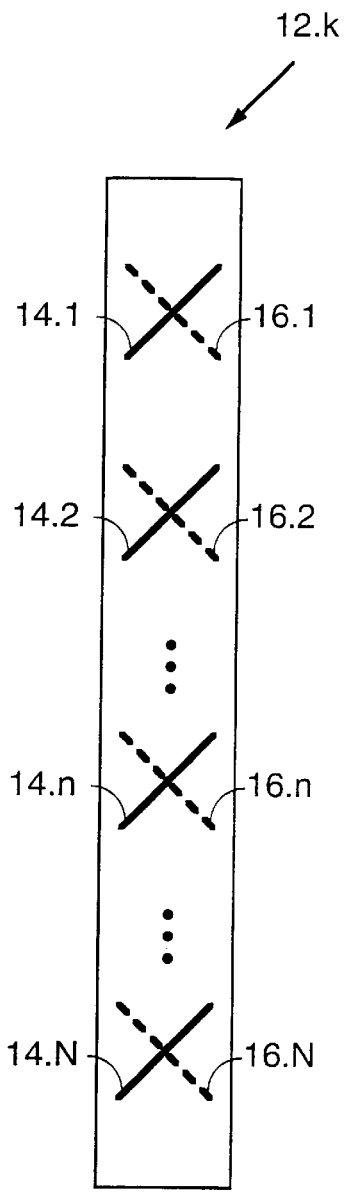
FIG. 2 is a front view of a dual polarized antenna element according to a preferred embodiment of the present invention.

FIG. 2 is a front view of a dual polarized antenna element according to a preferred embodiment of the present invention. The antenna element contains a first set of N dipole antennas 14.1, 14.2, . . . , 14.N having a first common polarization, and a second set of N dipole antennas 16.1, 16.2, . . . , 16.N having a second common polarization, where the first polarization is orthogonal to the second polarization. The first and second sets of dipole antennas are paired, forming a set of N dual polarized dipole pairs (14.1 and 16.1. 14.2 and 16.2, . . . , 14.N and 16.N) which are mounted in a linear column, as shown. Each set of the two dipoles 14.n and 16.n has separate conductive leads (not shown), allowing them to be used independently for reception and transmission. The dipoles 14.n and 16.n are mounted with +45 degree and –45 degree orientation to the vertical, giving them a relative orientation of 90 degrees (orthogonal polarization).

Reverse Link and Channel Estimation

During signal reception (i.e., reverse link, or uplink), the antenna array is preferably used as follows. The K antenna elements are divided into two groups: a first (odd) group and a second (even) group. Each group thus has K/2 antenna elements. The first group (shown in FIG. 3A) contains those elements 12.1, 12,3, . . . , 12.K–1 with odd antenna element indices k. The second group (shown in FIG. 3B) contains those elements 12.2, 12,4, . . . , 12.K with even antenna element indices k. These groups form two circular sub-arrays. As shown in FIG. 4 (where the K antennas are arranged linearly for illustration purposes only), the odd group is selected to have a first polarization, while the even group is selected to have a second polarization orthogonal to the first polarization. For example, the odd group is set to have only the +45 degree dipoles in the antenna elements selected, and the even group is set to have only the –45 degree dipoles selected. Alternatively, the odd group can have the –45 degree dipoles selected, and the even group can have the +45 degree dipole group selected.

Figure 5:
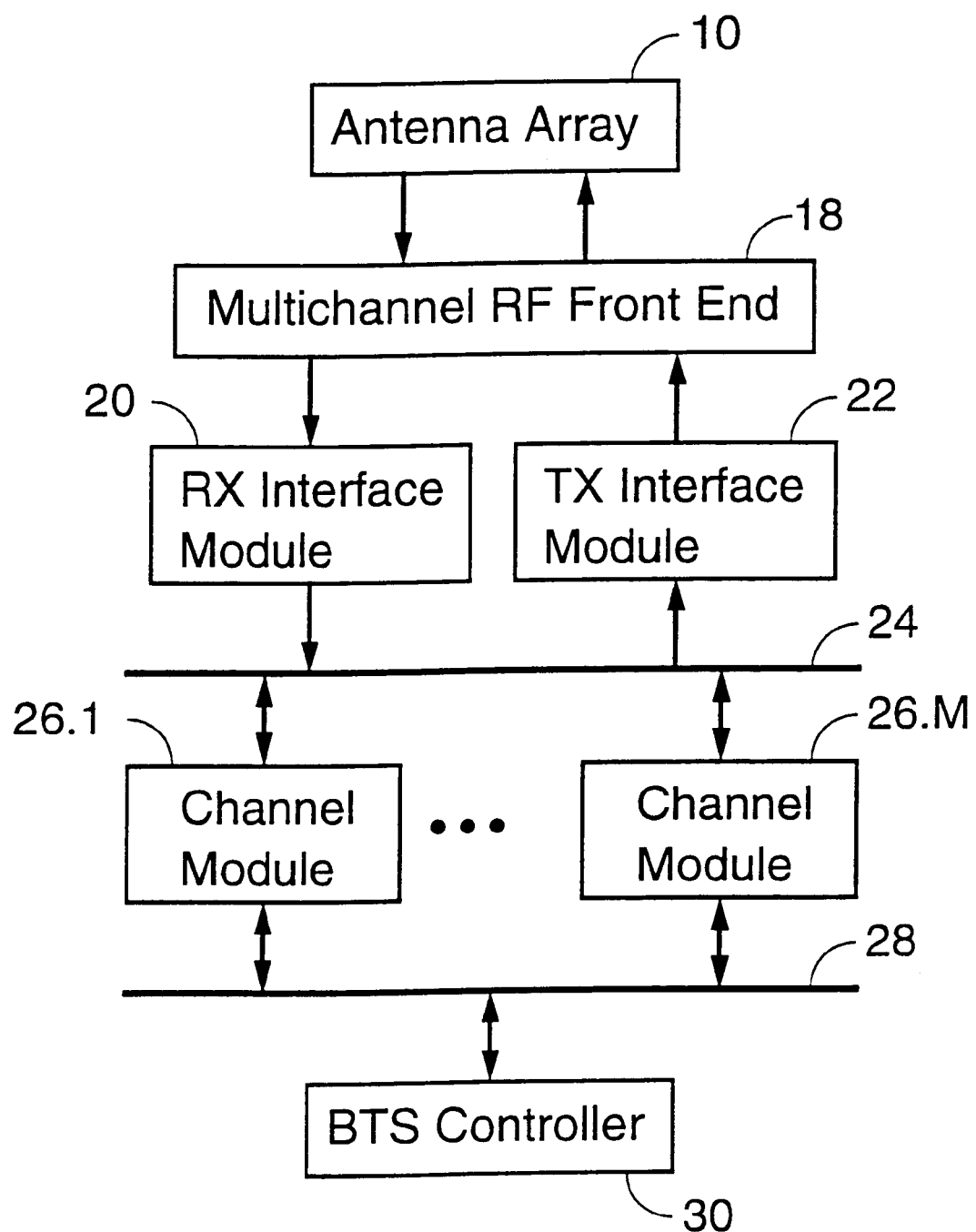
FIG. 5 is a block diagram illustrating a base station comprising the dual-polarized antenna 5 array and the method of using same, according to a preferred embodiment of the present invention

FIG. 5 is a block diagram illustrating a base station comprising the dual-polarized antenna array 10 described above. The antenna elements of antenna array 10 are connected to a multichannel RF front end 18, which will be further described below in relation to FIG. 6. The RF front end 18, is connected to a reception (RX) interface module 20 and a transmission (TX) interface module 22. A first data bus 24 connects the RX and TX interface modules 20 and 22 with a set of M channel modules 26.1, . . . , 26.M. The number M of channel modules is proportional to the total number of concurrent users that the base station is capable of serving. In current implementations, M is preferably 32, 64, or 128. These modules, in turn, are connected via a second data bus 28 to a BTS controller 30. As will be described in more detail below in relation to FIG. 7, the channel modules perform beam forming and channel estimation functions.

Signals detected by the antenna array 10 are processed through RF front end 18 and RX interface module 20, after which they enter channel modules 26.1, . . . , 26.M. During this processing, the signals remain separated into two groups, corresponding to the even and odd antenna sub-arrays selected for reception as described above. The two signal groups, corresponding to two orthogonal polarizations, are then separately processed by the channel modules. The channel modules perform spatial processing to estimate spatial channel properties of the two groups, such as the uplink spatial beam for a given mobile. Two sets of spatial information are thus derived from the two groups of orthogonally polarized signals. These two sets of information are then used to provide improved reception.

Figure 6:
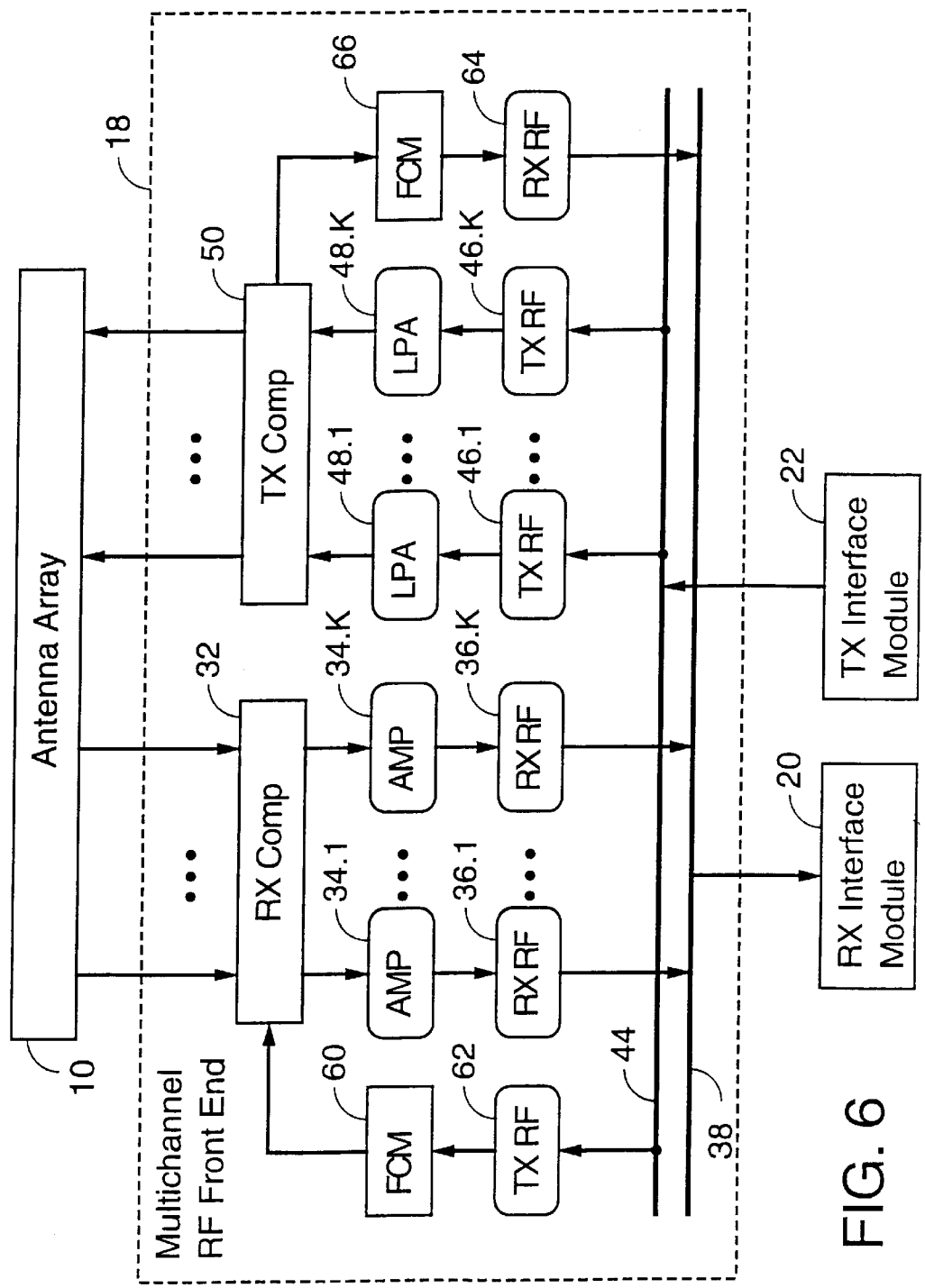
FIG. 6 is a block diagram detailing the components of a multichannel RF front end shown in FIG. 5

FIG. 6 is a block diagram detailing the components of the multichannel RF front end 18. A set of K signals from the antenna array 10 are modified by a reception (RX) compensation block 32, and then processed in parallel by a set of K amplifiers 34.1, . . . , 34.K and K receivers 36.1, . . . , 36.K. The signal from each antenna element is separately processed by these parallel chains so that the relative phase information between the K signals is preserved. The resulting K signals are then made available to the RX interface module 20 via a receiver bus 38.

Adaptive antenna array techniques in transmit/receive base stations require simultaneous reception and transmission of signal replicas through multiple channels. This function requires known receiving and transmitting channel behavior, namely, known amplitude and phase response. Analog parts of transmitting and receiving channels are typically subject to non-predictable changes due to various causes: temperature change, aging of components. receive and transmit power fluctuation, etc. Hence, a method to measure the phase and amplitude response of the channels for both receive and transmit paths is preferred. This transceiver compensation is accomplished in the present invention by incorporating frequency converter modules (FCMs 60 and 66, operating together with transmitter 62 and receiver 64, respectively) in the multichannel RF front end 18. One technique for accomplishing such transceiver compensations is described in detail in U.S. patent application Ser. No. 08/929,638 filed Sep. 15, 1997.

Figure 7:
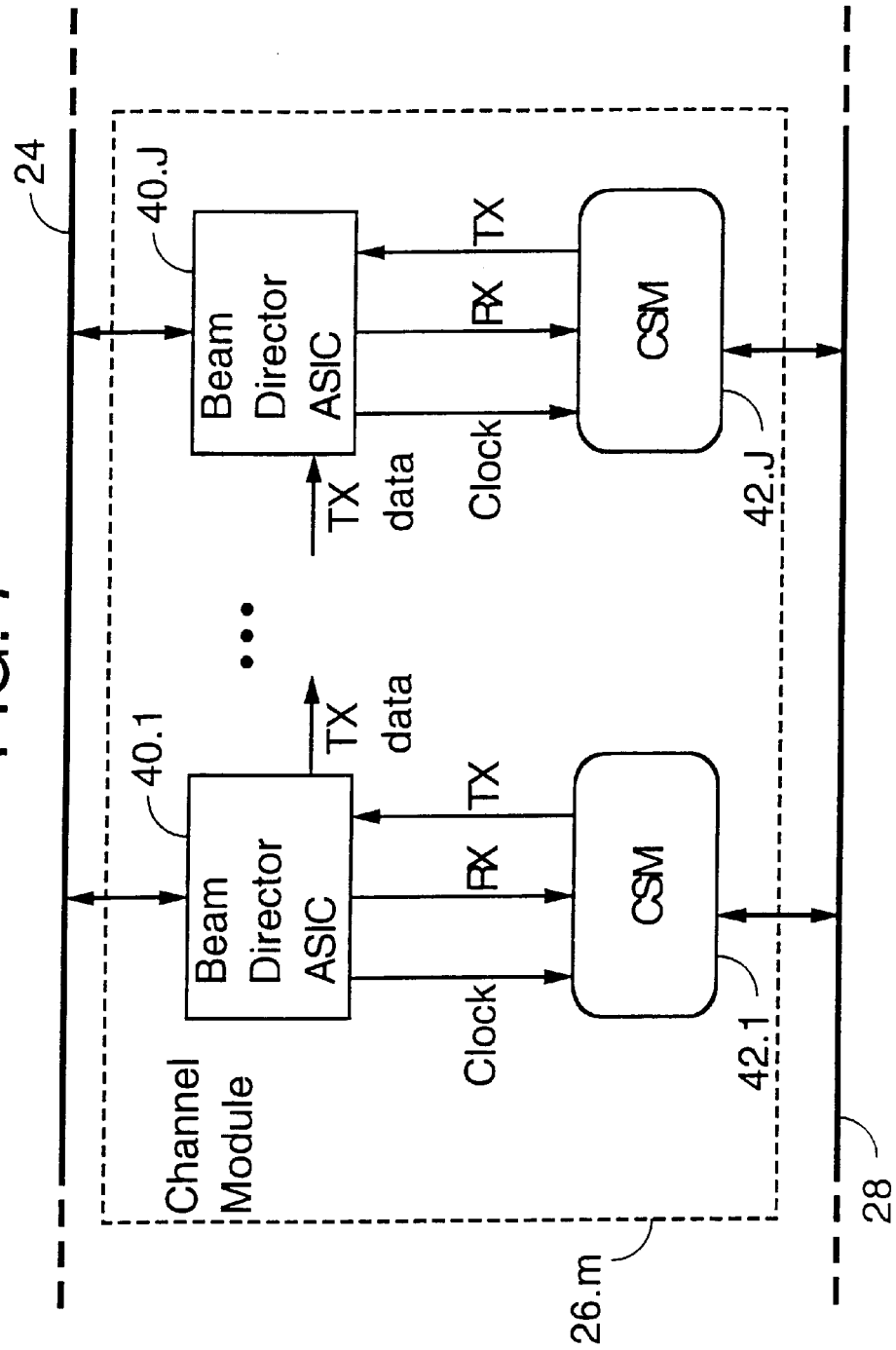
FIG. 7 is a block diagram illustrating the details of a channel module shown in FIG. 5

After passing through the RX interface; module 20, the K received signals are sent to set of M channel modules 26.1, . . . , 26.M for spatial processing. FIG. 7 is a block diagram illustration the details of a channel module 26.m. Each such module contains a set of J beam director ASICs 40.1, . . . , 40.J and a corresponding set of J. CSM processing blocks 42.1, . . . , 42.J. The value of J corresponds to the total number of concurrent users served by one channel module. The product of M and J (i.e., MJ) corresponds to the total number of concurrent users served by one base station, and is typically 32, 64, or 128. The beam directors perform beam-forming and channel-estimation functions, which are described in detail in U.S. patent application Ser. No. 09/229,482 filed Jan. 13, 1999 and U.S. patent application Ser. No. 08/929,638 filed Sep. 15, 1997. These spatial correlation (SPC) processes are separately and jointly performed on the two groups of signals from the two antenna groups. The results from the two groups are used to form $AOA_{odd}$ and $AOA_{even}$ histograms that are then used to determine the mean AOA and multipath for each polarization group. The AOA histogram can be computed either by counting the number of occurrences of the output from the channel estimator or by accumulating the magnitude of the output form the channel estimator. Magnitude accumulation is the preferred method. The two AOA histograms for the two groups can be combined linearly to determine the direction and width of the forward link beam. The ratio of the $AOA_{odd}$ histogram peak power to the $AOA_{even}$ histogram peak power is used to determine the preferred transmitting signal polarization.

Using the AOA histograms of the two signal groups, six reverse link beams can be formed in a beam director ASIC following these rules:

1. Select the two strongest peaks in $AOA_{odd}$ histogram (i.e., reject the second highest peak if it is located in the first side-lobe angle distance of the first highest peak, in which case the third highest peak is selected instead; reject the third highest peak if it is located in the first side-lobe angle distance of the first highest peak, in which case the forth highest peak is chosen instead).

2. Form a single sector-wide beam and two narrow beams using the odd-polarized sub-array in the direction of the selected AOA peaks.

3. Repeat of the $AOA_{even}$ histogram.

The narrow spatial beams provide for antenna gain, while the wide beams are used in case of failure in estimating the uplink channel. The failure may happen, for example, when the mobile is too close to the base station, when there is strong signal interference, or when there are other dynamic changes in the channels. The wide beam thus provides a signal even when the narrow beams are unintentionally misdirected.

U.S. patent application Ser. No. 09/229,482 filed Jan. 13, 1999 and U.S. patent application Ser. No. 08/929,638 filed Sep. 15, 1997 describe AOA histogram analysis techniques in detail, as well as the operation of BTS controller 30.
Forward Link In transmission (i.e., forward link or downlink) operation, all the antenna elements are preferably used as one single group, i.e., all K antennas are selected to have the same polarization. All the transmitting elements thus use either the +45 degree polarized dipoles. the −45 degree polarized dipoles, or both the +45 and −45 degree dipole pair simultaneously to effectively provide a single circular polarized or vertically polarized element. A set of K downlink signals generated by the channel modules pass through the TX interface module 22 and are made available on a transmission data bus 44 of the multichannel RF front end 18, as shown in FIG. 6. These K signals are processed in parallel by a set of K transmitters 46.1, . . . , 46.K and corresponding linear power amplifiers (LPAS) 48.1, . . . , 48.K. The signals then are modified by a transmission compensation circuit block 50. The FCM and RX RF are described above in relation to the reverse link and channel estimation. The downlink operation is otherwise identical to that described in U.S. patent application Ser. No. 09/229,482 filed Jan. 13, 1999. This arrangement provides the same performance as a vertically polarized array since the polarization of the mobile antenna and the electromagnetic field near it are typically random.

In an alternative embodiment of the downlink operation, rather than using a single polarization for all antenna elements in the array, the system adaptively adjusts the polarizations of the various antenna elements in the array. This adjustment can be accomplished by feeding both polarization dipoles (including both +45 and −45 degree polarization dipoles) in each antenna element to the transmitters. This operation requires doubling the number of transmitters to 2K. If signals arriving at base station have distinct polarization characteristics, beam forming coefficients controlling both +45 and −45 degree polarization dipoles can be adjusted so that the transmitted signals have the same polarization characteristics as the received signals. One way to estimate the polarization characteristics of the received signals is by computing the ratio of the $AOA_{odd}$ histogram peak power to the $AOA_{even}$ histogram peak power. An similar adaptive technique can be used in the uplink operation as well. In particular, the 2K receiver chains can be used simultaneously to receive from both polarizations of the K antennas, in analogy to the technique described above for transmission.

Since the diversity here is provided by polarization, the antenna array does not have to be large since very narrow beams are not required. The size of the array can be determined to provide sufficient beam shape with low side lobes. Since the beam shape quality is also desired for the downlink (because it allows for good beam shaping flexibility), the same array can be used for both uplink and downlink. The downlink can use either one of the polarized sub-arrays, or a combination of the sub-arrays (using hybrids to form circular polarized beams or linearly combined to form vertically polarized beams, etc.). This arrangement results in a much more compact antenna array.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A wireless communication system comprising:

an antenna array comprising a plurality of antenna elements, wherein said antenna elements comprise a first set of transducers having a first polarization and a second set of transducers having a second polarization;

means for estimating a first spatial beam from a first signal group associated with transducers of said first set of transducers;

means for estimating a second spatial beam from a second signal group associated with transducers of said second set of transducers; and a signal processor connected to means for estimating said first spatial beam and said means for estimating said second spatial beam operable to combine a signals from said first spatial beam and said second spatial beam to mitigate signal fading.

2. The system of claim 1 wherein said transducers comprise dipole antenna elements.

3. The system of claim 1 wherein said antenna elements are disposed in a circular configuration.

4. The system of claim 1 further comprising:

means for generating downlink spatial beams for the transmission of downlink signals using said estimated first and second spatial beams.

5. The system of claim 4 wherein the generated downlink signals are transmitted using dipoles having a common polarization.

6. The system of claim 1 wherein said signal processor is operable to determine a combined estimated direction of arrival of received signals from the first and second spatial beams.

7. A method for providing wireless communications comprising:

deploying an antenna array comprising a plurality of antenna elements, wherein said antenna elements comprise a first set of transducers having a first polarization and a second set of transducers having a second polarization;

forming a first group of angle-of-arrival histograms corresponding to signal groups received from antenna elements of said first set of transducers;

forming a second group of angle-of-arrival histograms corresponding to signal groups received from antenna elements of said second set of transducers; and estimating a direction of communication using at least one angle-of-arrival histogram of said first group of angle-of-arrival histograms and at least one angle-of-arrival histogram of said second group of angle-of-arrival histograms.

8. The method of claim 7 further comprising:

using said direction of communication in forming a downlink antenna beam.

9. The method of claim 7 wherein said at least one angle-of-arrival histogram of said first and second groups of angle-of-arrival histograms comprise angle-of-arrival histograms having a strongest peak.

10. A system for providing wireless communications comprising:

an antenna array comprising a plurality of antenna elements, wherein said antenna elements comprise a first set of transducers having a first polarization and a second set of transducers having a second polarization;

means for forming a first group of angle-of-arrival histograms corresponding to signal groups received from antenna elements of said first set of transducers;

means for forming a second group of angle-of-arrival histograms corresponding to signal groups received from antenna elements of said second set of transducers; and means for estimating a direction of communication using at least one angle-of-arrival histogram of said first group of angle-of-arrival histograms and at least one angle-of-arrival histogram of said second group of angle-of-arrival histograms.

11. The system of claim 10 further comprising:

means for forming a downlink antenna beam using said direction of communication.

12. The system of claim 10 wherein said at least one angle-of-arrival histogram of said first and second groups of angle-of-arrival histograms comprise angle-of-arrival histograms having a strongest peak.

* * * * *